March 10, 1959 K. W. SPILLMAN 2,876,495
APPARATUS FOR INJECTION MOLDING OF ARTICLES MADE
OF A THERMOPLASTIC
Filed April 6, 1954 3 Sheets-Sheet 2

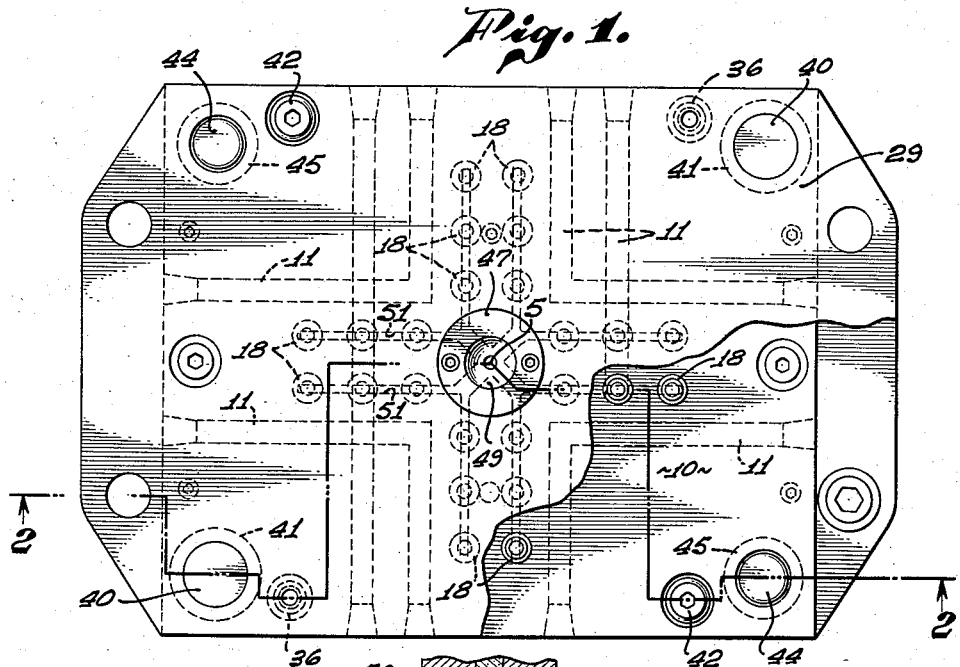
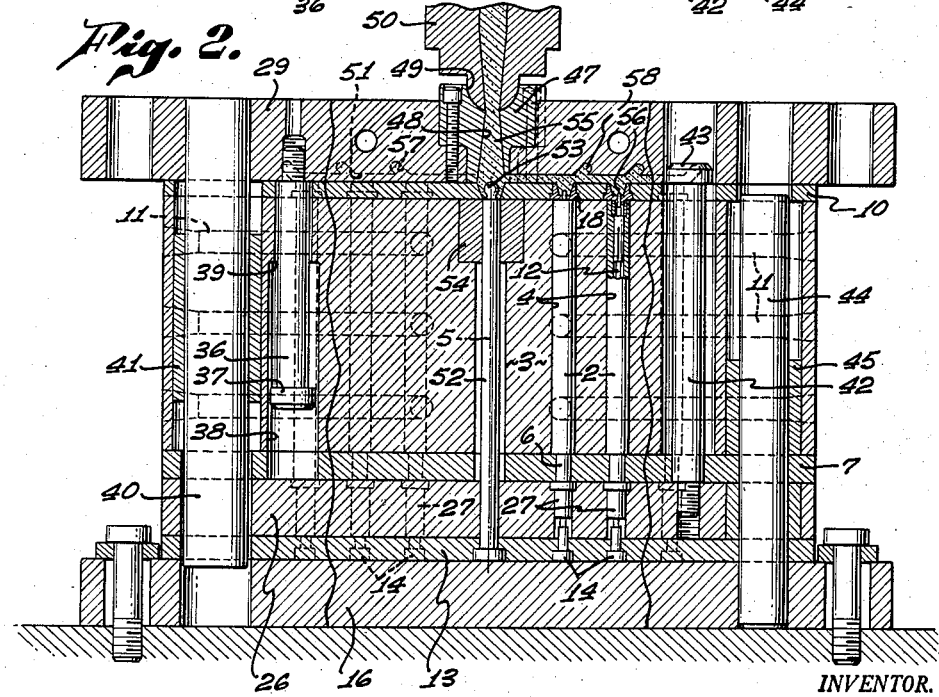

Fig. 3.

INVENTOR.
KENNETH W. SPILLMAN,
BY
Flam and Flam
ATTORNEYS.

United States Patent Office 2,876,495
Patented Mar. 10, 1959

2,876,495

APPARATUS FOR INJECTION MOLDING OF ARTICLES MADE OF A THERMOPLASTIC

Kenneth W. Spillman, Whittier, Calif., assignor, by mesne assignments, to The Parker Pen Company, Janesville, Wis., a corporation of Wisconsin Application April 6, 1954, Serial No. 421,358

13 Claims. (Cl. 18—30)

This invention relates to the molding of thermoplastic articles, and particularly tubular articles, by an injection process.

Tubular articles, such as containers, may commonly be formed either by an extrusion process or by an injection process. The extrusion process utilizes a die through which the liquefied and heated plastic material is squirted or extruded. In injection molding, an appropriate cavity is formed corresponding to the shape of the article, and the liquefied and heated plastic material is caused to flow into the cavity under pressure. In both cases, the subsequent cooling of the material causes it to set.

It is desirable to form a tubular ink container or reservoir for ball point pens out of polyethylene, since the material is translucent, and the remaining ink supply can be visibly determined at any time. The manufacture of such containers, however, presents a serious problem. The outside diameter must be kept small; and the wall thickness must also be small to render the tube flexible and translucent. In one example of a commercial tube, the outside diameter is .158 inch, and the inside diameter is .096 inch. However, these sizes are not critical. Furthermore, the tube or reservoir is of considerable length, of from 2½ inches to about 4½ inches.

When molded by the extrusion process, irregularities result on the inner and outer cylindrical surfaces. These irregularities cause the ink to cling to the inner cylindrical surface, making it difficult, if not impossible, visually to determine the remaining ink supply. These irregularities interfere seriously with the regularity of ink flow and render the article undesirable for use for such purposes. When injection molding is used, a core corresponding to the inner diameter must be provided. Since very high pressures must be employed, of the order of 15,000 pounds per square inch, the forces imposed by the fluid pressure during injection are apt to urge the core laterally of the mold cavity. The core being relatively long and thin, it may deflect in the cavity under these forces. Accordingly, true concentricity of the inner and outer surfaces cannot be attained. Upon curing or solidification, the tube may bend materially out of true. The extent of non-uniformity may be so extreme as to form a lateral opening in the tube. In less extreme cases, a very material weakening in the walls may result, presenting a danger of rupture.

It is one of the objects of this invention to make it possible to produce long, thin reservoirs or containers so as to maintain substantially accurate concentricity of the inner and outer walls.

For this purpose, use is made of a movable brace or pilot sleeve, slidable in the mold cavity and encompassing the core. As the liquid plastic is injected, the pilot sleeve is urged inwardly of the mold; accordingly, it prevents any lateral movement of the core, and especially at the place intermediate the end supports for the core.

It is accordingly another object of this invention to provide a process and apparatus for bracing the core during the molding operation.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a plan view, partly broken away, of a multiple mold structure incorporating the invention;

Fig. 2 is a vertical sectional view taken along a plane corresponding to line 2—2 of Fig. 1;

Fig. 3 is a view similar to Fig. 2, but illustrating the mold parts in extended or discharging position;

Fig. 4 is an enlarged scale longitudinal sectional view of one of the mold structures, and partly broken away to reduce the length of the figure; the mold being shown in condition for the beginning of the molding operation;

Fig. 5 is a fragmentary sectional view similar to Fig. 4, but illustrating the completion of the molding operation;

Fig. 6 is a fragmentary view similar to Fig. 4, illustrating the manner in which the molded article is stripped from the core;

Fig. 7 is a view similar to Fig. 4, illustrating the position of the parts while the mold parts are returning to the fully closed position of Fig. 4;

Fig. 8 is a still further enlarged sectional view, taken along a plane corresponding to line 8—8 of Fig. 4; and Fig. 9 is a fragmentary pictorial view of the upper end of the molded article.

Although in the present instance a multiple mold structure is illustrated, the method and apparatus may be adapted to a single mold device.

In the present instance, the mold provides 24 molding cavities, such as the cavity 1 shown in Figs. 4, 5 and 7. Each of these cavities is formed by the aid of the generally cylindrical cartridge 2.

In order to accommodate these cartridges, a mold member 3 (Fig. 2) is provided. This mold member has through bores 4 arranged in parallel relation for the accommodation of the cartridges 2. As shown most clearly in Fig. 1, these bores are arranged in sets of six, disposed around the central axis 5 of the mold structure.

Each of the cartridges 2 is provided with a reduced cylindrical extension 6, firmly fixed in a lower plate 7 attached to the lower surface of the mold section 3. The upper end of the cartridge 2 is provided with a counterbore for the accommodation of a bushing 8. This bushing 8 has an upper surface flush with the upper surface of the cartridge 2. Its inner cylindrical surface 9 forms a continuation of the cavity 1, the surface 9 being of slightly smaller diameter.

The upper surface of the mold member 3 carries a plate 10. Accordingly, the plates 7 and 10 and the mold member 3 form a single unit. Mold member 3 may be provided with appropriate water cooling passages which are illustrated diagrammatically by reference character 11 in Figs. 1 and 2.

The surface of the cavity 1 formed in the cartridge 2 is carefully lapped to the desired size. The cartridge 2 is made of hardened steel.

In order to form an annular molding space in cooperation with the cavity 1, a core structure 12 is provided for each cavity. The core structure 12 is of general cylindrical configuration. This core structure is adapted to be concentrically supported within the cavity 1, during the molding operation. It is made of high carbon steel, hardened, ground and highly polished. Accordingly, the interior and exterior surfaces of the molded tube 30 (Figs. 3 and 5) are free of imperfections or irregularities that would induce reverse flow of ink upon inverting the tube. Further, the tendency of the ink to wet the tube is minimized, and the walls of the tube are left clear and unstained as the ink column descends, so that the height of the column is readily ascertained.

The lower end of the core structure 12 is anchored to and supported by a bottom plate 13, relatively movable with respect to the mold member 3. For this purpose, a bushing 14 is provided for each core structure and attached to the plate 13. Silver solder 15 (Fig. 4) may be utilized firmly to attach the core structure 12 to the bushing 14.

Underlying the plate 13 and attached thereto is a supporting member or base 16. This base forms one of the pressure plates for the complete mold structure.

The upper end of each core structure 12 is provided with a reduced portion 17, terminating in a tapered end. This reduced portion 17 passes through a gate button 18, firmly fixed in the upper plate 10. This gate button 18 is provided with a tapered central recess 19 as well as a boss or extension 20 that telescopes within the bushing 8. The core extension 17 passes through this boss 20.

In communication with the recess 19 are a plurality of passages 21 which lead into the mold cavity 22 defined by the surfaces 1 and 9 and the exterior surface of the core structure 12. The diameter of the surface 1 is slightly larger than the diameter of the surface 9, which serve to define the outer surface of the article to be molded. The inner surface of the article to be molded is defined by the peripheral surfaces of the core structure 12.

The guiding aperture for the core extension 17 flares outwardly toward the bottom of the boss 20, as indicated by the tapered surface 23. However, in order to form through conduits between passages 21 and the upper portion of the mold cavities, the boss 20 is cut away to form three angularly spaced projections 24. The spaces 25 between these projections are in communication with the passages 21.

The upper end of the molded article 30, by virtue of the configuration of the molding surfaces and cavities, has a form shown in Fig. 9. The shoulder A has a width corresponding to the difference in radius of surfaces 1 and 9. The inwardly inclined surfaces B correspond to the inner surfaces of the projections 24 of boss 20 (Fig. 8).

Near the lower end of the core structure 12 is a shallow groove 35, for a purpose to be hereinafter set forth.

A stripper plate 26 is disposed between the plates 7 and 13 and is utilized in a manner to be hereinafter described. The stripper plate 26 is provided with bushings 27, one for each core structure 12. The core structure 12 passes through its corresponding bushing 27. A counterbore 28 is formed in the upper surface of the bushing 27 to form a continuation of the mold space 22.

In Figs. 2 and 4, the components of the mold structure are shown in operative molding position. The pressure plates 16 and 29 (Fig. 2) are urged together to hold all the parts in closed relation shown in Fig. 4, and in position for the beginning of the molding operation.

Heated liquid plastic material such as polyethylene, under high pressure, is supplied to the recess 19 of the gate button 18, in a manner to be hereinafter described. This liquid plastic material is forced by the high pressure, into the mold cavity 22 until the bottom of the mold cavity is reached.

The liquid pressure exerted by the heated plastic upon the relatively slender core structure 12 would deflect it, and cause intolerable inaccuracies, or even imperfections, in the finished article. For example, upon curing, the article may take a permanent arcuate set. This would render it incapable of use as an ink reservoir.

Provisions are accordingly made for bracing the core structure 12 during the injection process under high pressure. For this purpose, a slidable pilot sleeve structure 31 is provided, disposed around the core structure 12. This sleeve structure frictionally and resiliently engages the core structure and is urged downwardly of the mold cavity as the plastic material is supplied into the cavity. The annulus formed by the sleeve structure extends substantially entirely across the cavity 22.

The construction of the sleeve is shown to best advantage in Figs. 4, 5, 6 and 7. This sleeve is in the form of a hollow tubular body having a thickness corresponding to the annular space 22. The body is of considerable length and is provided with three saw cuts 32, equiangularly spaced to form three resilient fingers 33. These fingers are directed toward that end of the mold cavity remote from the end into which the plastic material is injected. Furthermore, the fingers are quite long, to provide flexibility.

In the initial position illustrated in Fig. 4 the sleeve structure 31 is in its uppermost position, abutting the lower edge of the bushing 8. That portion of the core 12 above the sleeve structure 31 is adequately supported since the core exterior 17 is piloted in the boss 20 of the gate button 18. Since the sleeve 31 is beneath the bushing 8, plastic material freely flows through the small gate button openings 21 into that portion of the molding cavity at the bushing 8 (Fig. 4). Now as the injected plastic fills that portion of the cavity at the bushing 8, the sleeve 31 is urged downwardly by fluid pressure, until it finally enters the counterbore 28 of the bushing 27 of the intermediate plate 26, shown in Fig. 5. Since the upper surface of the sleeve 31 is, in its uppermost position, spaced from the gate button openings 21, a substantial area is provided by the upper surface of the sleeve 31 over which the pressure of the injected plastic my act. A sufficient force is ensured to cause the initial movement of the sleeve 31 downwardly against the restraint provided by the spring fingers 33. Downward movement of the sleeve 31 is limited by the bottom of the counterbore 28 of bushing 27. This molding operation is carried on while all the mold parts are held together in a press.

The cavity 22 is long enough so that it can accommodate the pilot sleeve 31 and yet form the desired length of the molded article 30. The upper edge of the counterbore 28 is beveled in order to guide entering movement of the sleeve structure 31.

During the downward travel of the pilot sleeve 31 between the positions of Figs. 4 and 5, the pilot sleeve serves to brace the core structure 12. As the pilot sleeve proceeds downwardly in the cavity 22 the plastic material itself forms a sufficient support for the core structure 12 above the sleeve 31.

The shallow annular groove 35 adjacent the bottom portion of the core structure 12, is located above the sleeve 31 when the sleeve 31 is in its lowermost position. This groove provides an inner ridge within the finished article. This ridge serves effectively as a friction grip for an inserted metal thimble in which is accommodated a rolling ball for the ball point pen.

Ejecting of the molded article 30 and the return of the sleeve 31 to the initial position of Fig. 4 is effected by the aid of the relatively movable portions of the mold structure. Thus the upper pressure plate 29 and the lower pressure plate 16 are capable of being moved apart to the position shown in Fig. 3. Initially in the closed position of Fig. 2, these plates are urged strongly together within the mold press so as to sustain the forces resulting from injection molding.

The intermediate mold member 3 is first separated from the pressure plate 29 in a manner to be hereinafter described. This separation is limited by the aid of a pair of spacer bolts 36 threaded into the lower side of the plate 29 and having a head 37, having a recess for an Allen wrench. This head 37 operates in an aperture 38 formed in the mold member 3, and ultimately engages a shoulder 39 formed in the aperture. Additional means guiding axial separation of the pressure plate 29 and mold member 3 is effected by the aid of a plurality of guide pins 40 joined to the plate 29 and engaging in guide bushings 41 mounted in the mold member 3.

After the mold member 3 attains its extreme separated position, as illustrated in Fig. 3, the core structures 12 and the molded tubes 30 are pulled out of the cartridges 2. This is effected by continued relative separating movement of the lower pressure plate 16 and the supplemental plate 13. The stripper plate 26, however, is stopped in its downward movement by the aid of a pair of stripper bolts 42 threaded into the stripper plate 26 and each having a head 43 engaging the upper surface of the plate 7.

Upon continued separating movement of the lower pressure plate 16, the stripper plate 26 remains stationary while the core structures 12 carried by the plate 16 continue their movement. Each sleeve 31 is, however, stopped from further movement by the bottom of counterbore 28 in bushing 27, mounted in stripper plate 26 (Fig. 6). Accordingly, the lower end of the molded article 30 is also stopped because of its engagement with the top of sleeve 31.

Relative downward movement of the pressure plate structure 13–16 is guided by the aid of the posts 44 attached to the plate 16 and extending into bushings 45 in the mold member 3, when the mold structure is in the closed position of Fig. 2.

The fully completed separating movement of the core structure 12 is shown in Fig. 6. The core structure is retracted with the sleeve 31, and is thus freed from the molded article. One such article 30 is indicated in Fig. 3. The article 30 can be removed from between the separated stripper plate 26 and plate 7.

A tapered shoulder 46 on the core structure 12 is engaged by the lower ends of the fingers 33.

The closing movement of the mold parts returns all these parts to the initial position of Fig. 4. The cores 12 carried by the lower plate 16 move upwardly toward the lower end of cartridge 2. The plate 13 contacts the lower surface of the stripper plate 26. The core structures 12 enter into the lower extension 6 of the cartridge 2. Continued upward movement carries the stripper plate 26 upwardly until it engages the lower surface of plate 7. Then the mold member 3 is moved upwardly to the fully closed position of Fig. 2.

The fingers 33 of the pilot sleeve 31 being in engagement with the tapered shoulder 46, are correspondingly moved upwardly with the core 12. Entering movement of the sleeve structure 31 into the cartridge is guided by a beveled lower edge at the lower end of the cartridge surface 1. The engagement between the sleeve fingers 33 and the core shoulder 46 ensures upward travel of the sleeve in the cartridge 2 against the forces of friction between the sleeve 31 and the cartridge surface 1. The travel of the sleeve 31 is finally arrested by the lower surface of the bushing 8. This position is shown in Fig. 7. Continued upward movement of the core structure 12 causes the spring fingers 32 to spread and to assume the position of Fig. 4. This is effected by the wedging action of the tapered shoulder 46 upon the finger ends 33. Complete closing of the mold causes the extension 17 at the core to extend into the recess 19 of the gate button 18. The mold structure is now ready for the next molding operation.

The manner in which the flow of liquid plastic may reach all of the gate buttons 18 is best described in connection with Figs. 2 and 3. Thus the upper pressure plate 29 carries a central sprue member 47, which has a diverging gate or passage 48. A spherical seat 49 is provided for the accommodation of the lower end of a supply nozzle 50. This supply nozzle 50 is firmly seated in the cavity of recess 49.

The lower surface of the pressure plate 29 has grooves 51. These grooves, with the upper surface of plate 10, form passages between the gate 48 and the gate buttons 18. A sprue puller 52 is disposed centrally of the mold member 3 and is firmly attached to the lower pressure plate structure 13–16. The upper end of this sprue puller 52 carries a round ball-like protuberance 53 which is imbedded in and forms an interlock with the plastic material flowing through the passage or gate 48. This sprue is caused to move with the mold member 3 away from the pressure plate 29, entirely clearing the pressure plate 29. The upper portion of this sprue puller 52 is guided in a bushing 54 mounted in the upper surface of the mold member 3.

Accordingly, immediately upon relative separating movement of the pressure plates 29 and 16, the sprue puller 52 pulls the sprue 55 away from the gate opening 48.

Along each of the grooves 51 the sprue has tapered or conical projections 56 corresponding to the recesses 19 of the gate buttons 19. In order to facilitate separation of these projections 56 at the gate button supply passages 21, the grooves 51 on the lower surface of the pressure plate 29 are provided with oblique recesses 57. Accordingly, the sprue forms correspondingly oblique projections 58 in these recesses. Upon initial separating movement of the mold member 3, the oblique recesses 57 restrain separating movement of the sprue arms 59. Accordingly, the projections 56 immediately break away at the gate button passages 21, pulling the plastic material from the gate button passages 21. Upon continued separating movement of the mold member 3, the oblique projections are pulled free of the oblique recesses 57, the restraint imposed thereby now being overcome. During this movement, relative upward bending of the sprue arms 59, as shown in Fig. 3, is caused.

The sprue puller 52 is withdrawn from the sprue as soon as movement of the mold member 3 is stopped. The sprue is easily manually lifted from the plate 10, sufficient access being provided for this purpose between the pressure plate 29 and the mold member 3 when separated.

The inventor claims:

1. In plastic injection molding apparatus for a hollow article: means forming an elongate mold cavity; a core extending along the cavity and supported at opposite ends; and a sleeve slidable on the core and fitting into the cavity; said sleeve having slots opening at one end to define resilient fingers gripping the core.

2. In plastic injection molding apparatus for a hollow article: means forming an elongate mold cavity; a core extending along the cavity and supported at opposite ends; and a sleeve slidable on the core and fitting into the cavity; said sleeve having slots opening at one end to define resilient fingers gripping the core; said fingers facing toward that end of the cavity remote from the end into which the plastic is injected.

3. In plastic injection molding apparatus for a hollow article: means forming a mold cavity; a core extending along the cavity and supported at opposite ends; a sleeve having resilient core gripping means, slidable along the core and fitting into the cavity; said core and sleeve being longitudinally relatively movable to withdraw the core with the molded article from the cavity; and a stripper engaging one end of the sleeve for urging the article off the core; said cavity having means engaging the other end of the sleeve upon moving the core inwardly of the cavity; said core having a shoulder for yieldingly maintaining the sleeve in stripper position until the said sleeve engaging means returns the sleeve to a starting position.

4. In plastic injection molding apparatus for a hollow article: means forming a mold cavity; a core extending along the cavity and supported at opposite ends; a sleeve slidable along the core and fitting into the cavity; said sleeve having resilient fingers yieldingly gripping the core, said fingers being directed toward that end of the cavity remote from the end into which the plastic is injected; means carried by the cavity forming a stop for the travel of the sleeve toward the injection end; said core being relatively longitudinally movable with respect to the cavity to withdraw the molded article therewith; and a stripper member engaging the sleeve to cause the sleeve to free the article from the core; said core having a shoulder engaging the ends of the fingers yieldingly to cause relative movement of the sleeve into the cavity as the core moves into the cavity; said fingers expanding to pass said shoulder when said stop engages said sleeve.

5. In a plastic injection molding apparatus: means forming a mold cavity; a support for the cavity forming means; and means defining a sprue cavity communicating with the mold cavity, and relatively movable with respect to said support; means for pulling the sprue with the support away from said sprue cavity forming means; said sprue cavity having one or more recesses oblique to the direction of relative movement, for causing the sprue to be moved relative to the support as the means forming the mold cavity is moved relative to the means forming the sprue cavity.

6. In plastic injection molding apparatus for a hollow article: means forming an elongate molding cavity having an inlet end; a core; a movable support for one end of the core, the support being movable to position the core within the cavity and movable to retract the core and the molded article from the opposite end of the cavity; a sleeve yieldingly gripping the core and slidable therealong and adapted to fit the cavity; a stripper plate engageable with the sleeve to cause the other end of the core to be retracted within the sleeve upon movement of the support to a limiting position beyond the retracted position of the core; means forming a yieldable restraint between the core and the sleeve for maintaining the said other core end within the sleeve upon movement of the support in a direction toward the cavity; and abutment means near the inlet end of said cavity engaging the sleeve to overcome said restraint forming means prior to full advancement of the core into said cavity; the yieldable restraint being sufficient to cause movement of the sleeve into the cavity against the force of friction between the sleeve and the cavity.

7. In a plastic injection molding apparatus: a pair of relatively movable mold parts, one of said parts having means forming a mold cavity; said parts having sprue cavity forming means; said one part having passage forming means connecting the sprue cavity with the mold cavity; means for causing a sprue formed by the sprue cavity to move with said one part upon relative movement between the parts; said other part having means forming recesses communicating with the sprue cavity that are oblique to the direction of relative movement to cause the sprue to move relative to the said one part to break the sprue at the passage forming means.

8. In plastic injection molding apparatus for a hollow open ended article: a first mold member having means forming an elongate cavity; a second mold member on one side of said first mold member and having means forming a sprue cavity; a third mold member on the opposite side of said first mold member; said mold members being separable by relative movement in a direction longitudinally of said caviy; a core member carried by said third mold member and extending into said cavity when said first and third mold members are moved together; interlocking means engaging a part of the sprue for pulling the sprue with the first mold member upon relative separation between said first and second mold members; said second mold member having recesses spaced from said interlocking means and extending oblique to said direction to provide a yieldable restraint against separating movement between said sprue and said first mold member, thereby causing the sprue to be broken from the article molded in said cavity upon relative separation between said first and second mold members; and means for separating said first and second mold members and then separating said first and third mold members for withdrawing the molded article from said cavity.

9. In plastic injection molding apparatus for a hollow open ended article: a first mold part having an elongate cavity; a second mold part relatively separable from said first mold part in a direction longitudinally of said cavity; an elongate core carried by said second mold part and extending into said cavity from one end thereof when said mold parts are moved together; means for admitting plastic material into the other end of said cavity; a sleeve carried by said core and yieldingly gripping said core and slidable therealong in advance of the plastic admitted into said cavity; means for separating said mold parts to withdraw the molded article together with the core from said cavity; means for further separating said mold parts while restraining movement of said sleeve for withdrawing said core from said molded article and to position said sleeve at the free end of said core; and means for moving said core parts together.

10. In plastic injection molding apparatus for a hollow open ended article: a first mold part having an elongate cavity; a second mold part relatively separable from said first mold part in a direction longitudinally of said cavity; an elongate core carried by said second mold part and extending into said cavity from one end thereof when said mold parts are moved together; means for admitting plastic material into the other end of said cavity; a sleeve carried by said core and yieldingly gripping said core and slidable therealong in advance of the plastic admitted into said cavity; means for separating said mold parts to withdraw the molded article together with the core from said cavity; means for further separating said mold parts while restraining movement of said sleeve for withdrawing said core from said molded article and to position said sleeve at the free end of said core; said core having a shoulder adjacent its free end forming a yieldable restraint against movement of said sleeve toward the secured end of said core and operative when said mold parts are fully separated; and means for moving said core parts together; said yieldable restraint ensuring movement of said sleeve into said cavity.

11. In plastic injection molding apparatus for a hollow open ended article: a first mold part having an elongate cavity; a second mold part relatively separable from said first mold part in a direction longitudinally of said cavity; an elongate core carried by said second mold part and extending into said cavity from one end thereof when said mold parts are moved together; means for admitting plastic material into the other end of said cavity; a sleeve carried by said core and yieldingly gripping said core and slidable therealong in advance of the plastic admitted into said cavity; means for separating said mold parts to withdraw the molded article together with the core from said cavity; means for further separating said mold parts while restraining movement of said sleeve for withdrawing said core from said molded article and to position said sleeve at the free end of said core; said core having a shoulder adjacent its free end forming a yieldable restraint against movement of said sleeve toward the secured end of said core and operative when said mold parts are fully separated; means for moving said core parts together; said yieldable restraint ensuring movement of said sleeve into said cavity; and stop means located adjacent the upper end of said cavity for limiting movement of said sleeve into said cavity and operative in advance of full movement of said core parts together.

12. In plastic injection molding apparatus: a first mold member having means forming an elongate cavity; a second mold member movable with respect to said first mold member in a direction parallel to said cavity; a stripper plate between the mold members, and having an aperture aligned with said cavity; an elongate core carried by said second mold member and extending through said aperture and into said cavity when said members are moved together; a sleeve carried by the core, and fitting the cavity, said sleeve having resilient core gripping means, said stripper plate limiting movement of said sleeve in one direction; means for moving said second member and said stripper plate away from said first member to withdraw the molded article and the core from the cavity and then for moving said second member away from said stripper plate to withdraw said core from the molded article; and means for moving the members together.

13. In plastic injection molding apparatus: a first mold member having means forming an elongate cavity; a second mold member movable with respect to said first mold member in a direction parallel to said cavity; a stripper plate between the mold members, and having an aperture aligned with said cavity; an elongate core carried by second mold member and extending through said aperture and into said cavity when said members are moved together; a sleeve carried by the core, and fitting the cavity, said sleeve having resilient core gripping means; said stripper plate limiting movement of said sleeve in one direction; means for moving said second member and said stripper plate away from said first member to withdraw the molded article and the core from the cavity and then for moving said second member away from said stripper plate to withdraw said core from the molded article; and means for moving the members together; said core having means forming a yieldable restraint against movement of said sleeve, and located adjacent the free end of said core, for causing movement of said sleeve along said cavity against the force of friction when said members are moved together.

References Cited in the file of this patent
UNITED STATES PATENTS

| | | |
|---|---|---|
| 2,301,338 | Smith | Nov. 10, 1942 |
| 2,380,042 | Hauton | July 10, 1945 |
| 2,434,594 | Schultz | Jan. 13, 1948 |
| 2,446,872 | Ehlers | Aug. 10, 1948 |

OTHER REFERENCES

Ser. No. 391,198, Chapius (A. P. C.), published June 15, 1943.